United States Patent
Bashan et al.

(10) Patent No.: US 11,757,919 B2
(45) Date of Patent: Sep. 12, 2023

(54) SYSTEM AND METHOD FOR CATASTROPHIC EVENT MODELING

(71) Applicant: Kovrr Risk Modeling, Ltd., Tel-Aviv (IL)

(72) Inventors: Avi Bashan, Givat Shmuel (IL); Amir Kessler, Tel Aviv (IL); Shalom Bublil, Tel Aviv (IL); Marco Lo Giudice, London (GB); Yakir Golan, Kibbutz Yagur (IL)

(73) Assignee: KOVRR RISK MODELING LTD., Tel-Aviv (IL)

( * ) Notice: Subject to any disclaimer, the term of this patent is extended or adjusted under 35 U.S.C. 154(b) by 0 days.

(21) Appl. No.: 17/235,461

(22) Filed: Apr. 20, 2021

(65) Prior Publication Data
US 2022/0191231 A1    Jun. 16, 2022

Related U.S. Application Data

(60) Provisional application No. 63/012,421, filed on Apr. 20, 2020.

(51) Int. Cl.
*H04L 9/40* (2022.01)

(52) U.S. Cl.
CPC ...... *H04L 63/1433* (2013.01); *H04L 63/1408* (2013.01); *H04L 63/1441* (2013.01)

(58) Field of Classification Search
CPC ............ H04L 63/1433; H04L 63/1408; H04L 63/1441
See application file for complete search history.

(56) References Cited

U.S. PATENT DOCUMENTS

| | | | |
|---|---|---|---|
| 8,407,798 B1 * | 3/2013 | Lotem | G06F 21/55 726/21 |
| 8,566,128 B2 | 10/2013 | Koziol | |
| 8,595,176 B2 | 11/2013 | Wang et al. | |
| 8,595,831 B2 | 11/2013 | Skare | |
| 8,601,587 B1 * | 12/2013 | Powell | G06F 21/552 726/25 |
| 8,607,353 B2 | 12/2013 | Rippert, Jr. et al. | |
| 8,626,667 B2 | 1/2014 | Walker et al. | |
| 8,650,637 B2 | 2/2014 | Beresnevichiene et al. | |
| 9,032,521 B2 | 5/2015 | Amini et al. | |
| 9,092,631 B2 | 7/2015 | Muller et al. | |
| 9,215,244 B2 | 12/2015 | Ayyagar et al. | |
| 9,292,695 B1 | 3/2016 | Bassett | |
| 9,401,926 B1 | 7/2016 | DuBow et al. | |

(Continued)

FOREIGN PATENT DOCUMENTS

| | | | |
|---|---|---|---|
| CN | 106797378 A | 5/2017 | |
| CN | 107147515 A | 9/2017 | |

(Continued)

*Primary Examiner* — Ali S Abyaneh
(74) *Attorney, Agent, or Firm* — M&B IP Analysts, LLC

(57) ABSTRACT

A system and method for catastrophic event modeling are provided. The method includes generating a cyber event catalog based on a past cyber event, the cyber event catalog including a plurality of cyber events; and simulating a cyber event, of the plurality of cyber events included in the cyber event catalog, to predict whether an organization is affected by a simulated cyber event, wherein the organization is an organization selected from a hazard table.

21 Claims, 5 Drawing Sheets

(56) References Cited

U.S. PATENT DOCUMENTS

| | | | |
|---|---|---|---|
| 9,602,530 B2 | 3/2017 | Ellis et al. | |
| 9,680,855 B2 | 6/2017 | Schultz et al. | |
| 9,774,616 B2 | 9/2017 | Flores et al. | |
| 10,419,466 B2 | 9/2019 | Ferguson et al. | |
| 10,503,347 B2 | 12/2019 | Humayun et al. | |
| 10,574,685 B2 | 2/2020 | Vallone et al. | |
| 10,592,989 B2 | 3/2020 | Koziol | |
| 10,614,401 B2 | 4/2020 | Mo et al. | |
| 10,630,713 B2 | 4/2020 | Walheim et al. | |
| 10,757,127 B2 | 8/2020 | Schultz et al. | |
| 10,826,928 B2 | 11/2020 | Carey et al. | |
| 10,878,329 B1* | 12/2020 | Grenier | G06N 7/005 |
| 2005/0071140 A1* | 3/2005 | Ben-Hur | G06K 9/6218 |
| | | | 703/11 |
| 2013/0227697 A1* | 8/2013 | Zandani | G06F 21/57 |
| | | | 726/25 |
| 2013/0347116 A1* | 12/2013 | Flores | H04L 63/1433 |
| | | | 726/25 |
| 2015/0142649 A1 | 5/2015 | Rathod | |
| 2016/0330219 A1 | 11/2016 | Hasan | |
| 2017/0244740 A1* | 8/2017 | Mahabir | H04L 63/1433 |
| 2017/0270295 A1 | 9/2017 | Park et al. | |
| 2017/0279843 A1 | 9/2017 | Schultz et al. | |
| 2019/0207981 A1* | 7/2019 | Sweeney | H04L 41/145 |
| 2019/0251260 A1 | 8/2019 | Stockdale et al. | |
| 2019/0373005 A1 | 12/2019 | Bassett | |
| 2021/0150569 A1* | 5/2021 | Alahmady | G06Q 30/0244 |

FOREIGN PATENT DOCUMENTS

| | | |
|---|---|---|
| CN | 104410617 B | 4/2018 |
| EP | 3211854 B1 | 12/2020 |
| JP | 2017199365 A | 11/2017 |

\* cited by examiner

SYSTEM AND METHOD FOR CATASTROPHIC EVENT MODELING

CROSS-REFERENCE TO RELATED APPLICATIONS

This application claims the benefit of U.S. Provisional Application No. 63/012,421 filed on Apr. 20, 2020, the contents of which are hereby incorporated by reference.

TECHNICAL FIELD

The present disclosure relates generally to event modeling and, more specifically, to modeling for predicting catastrophic events.

BACKGROUND

As businesses have become more interconnected due to the ubiquitous use of the internet, new challenges arise which can threaten the security of a business. These threats include an increase in cyber and internet-based attacks. Such attacks can encompass traditional hacking, such as the insertion of viruses within a network, phishing attacks to extract sensitive information, and distributed denial of services attacks which can disrupt the normal traffic of a network and cause it to grind to halt. While bad actors still heavily employ these techniques, and robust security to protect against such attacks is paramount for the safety of a business, more recent trends have evolved that expose businesses to potentially more damaging attacks. Such high-damage attacks include attacks which fall under the category of catastrophic cyber events.

Catastrophic cyber events can include ransomware attacks, wherein a malicious entity gains access to a network and prevents the rightful owner from accessing their data, e.g., by encrypting servers and demanding payment for the decryption key. An example of such ransomware is the WannaCry attack which targeted computers using the Microsoft® Windows operating system by encrypting users' data and demanding payment in the form of anonymous Bitcoin payments. WannaCry infected hundreds of thousands of computers and caused, at a minimum, hundreds of millions of dollars of damage to various businesses and governments.

These catastrophic events, however, are not limited to intentional malicious actors acting directly on a particular company, e.g., by infecting the target's on-premises servers or databases. Many businesses rely heavily on third-party software and third-party providers, each of which may fail for a variety of reasons which significantly impact customers. Data loss, service outages, and various security vulnerabilities can cause an enormous domino effect from a large provider, down to an end user, when an essential part of a business workflow is affected. For example, Amazon® Web Services (AWS®) provides distributed cloud computing, web services, and storage to hundreds of thousands of businesses across the world. As a large third-party provider, if even part of the AWS® infrastructure suffers from a significant attack, such as an encrypting ransomware attack, many client businesses would be unable to continue normal business operations. Likewise, millions of businesses rely on the Microsoft® Office suite. Should an attacker leverage an exploit in a suite program, every end user would be vulnerable to the attack, often without the direct ability to patch the issue.

As cyber threats continue to become more prevalent, businesses begin to account for the possibility of attacks and the costs thereof. Insurance companies now offer cyber insurance products to protect clients, both from internal loss and from liability from loss caused to end users. Further, insurance and reinsurance providers must also take into consideration the expected likelihood of a single cyber event affecting multiple companies in their portfolio as part of financial strategy planning. However, because third-party software and services are not fully within the control of the end user, e.g., a business employing vulnerable software and hardware, and because new forms of attacks, which are designed to propagate across networks, are regularly being developed and deployed, it is difficult to accurately predict when a business will be affected by such exploits and, if infected, the amount of damage anticipated.

Because such cyber-attacks are often novel and without direct precedent, traditional modeling fails to provide accurate estimations, both for the insurance and reinsurance companies, as well as for the businesses themselves. Current solutions are limited. Some current solutions apply a use-centered approach, such as determination of how many businesses use a certain software, determination of the sum of all potential losses that would be caused by an exploit of that software, and assignment of a per-company risk value. Other solutions employ a deterministic modeling approach that estimates the impact using a set of pre-determined parameters. However, these approaches will generally treat all companies, or all companies within a particular sector, as the same. Since individual companies will have varied degrees of exposure to different cyber risks, these approaches are limited in their accuracy.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the terms "some embodiments" or "certain embodiments" may be used herein to refer to a single embodiment or multiple embodiments of the disclosure.

Certain embodiments disclosed herein include a method for catastrophic event modeling. The method comprises: generating a cyber event catalog based on a past cyber event, the cyber event catalog including a plurality of cyber events; and simulating a cyber event, of the plurality of cyber events included in the cyber event catalog, to predict whether an organization is affected by a simulated cyber event, wherein the organization is an organization selected from a hazard table.

Certain embodiments disclosed herein also include a non-transitory computer readable medium having stored thereon instructions for causing a processing circuitry to execute a process for catastrophic event modeling, the process comprising: generating a cyber event catalog based on a past cyber event, the cyber event catalog including a plurality of cyber events; and simulating a cyber event, of the plurality of cyber events included in the cyber event catalog, to predict whether an organization is affected by a simulated cyber event, wherein the organization is an organization selected from a hazard table.

In addition, certain embodiments disclosed herein include a system for catastrophic event modeling. The system comprises: a processing circuitry; and a memory, the memory containing instructions that, when executed by the processing circuitry, configure the system to generate a cyber event catalog based on a past cyber event, the cyber event catalog including a plurality of cyber events; and simulate a cyber event, of the plurality of cyber events included in the cyber event catalog, to predict whether an organization is affected by a simulated cyber event, wherein the organization is an organization selected from a hazard table.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
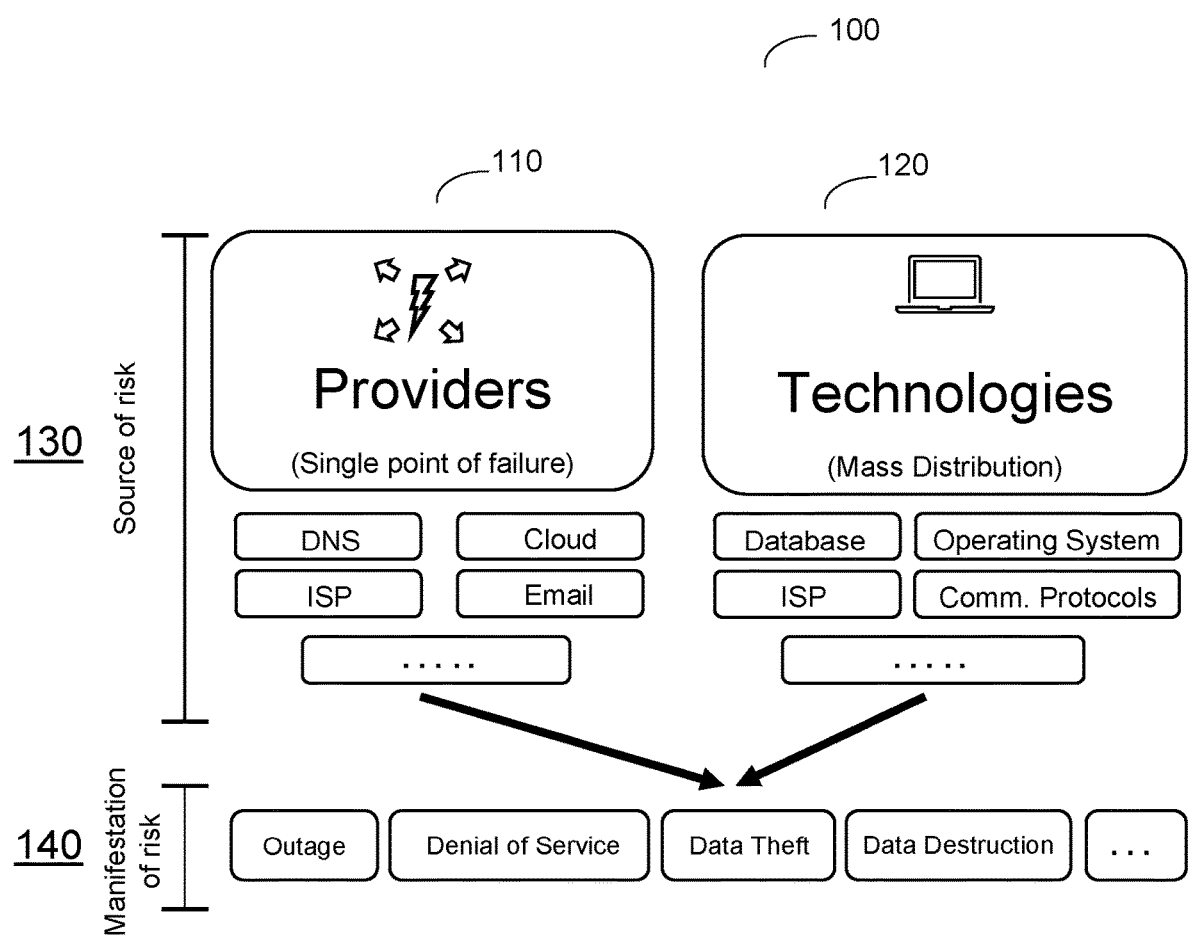
FIG. 1 is a block diagram of potential risk sources and manifestations of those risks which are incorporated in catastrophic event modeling, according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for modeling catastrophic events. The method includes employing a modeling framework that addresses events that affect third parties, including service providers that provide off-premises services, such as cloud computing, and technology providers that provide on-premises software used by other companies. The modeling framework includes accounting for physical locations of the clients, data cleansing and grouping, cataloging events, distilling the data to reduce the size of the catalog, and running simulations. Based on the simulations, an estimate of the potential damage caused by a catastrophic event is calculated.

The embodiments disclosed herein provide certain improvements in the processing and application of data in the modeling of catastrophic events. As described herein, the methods, structures, and the like, included in, and applied by, the various aspects of the disclosed embodiments provide for improvements in modeling task accuracy and granularity. Specifically, as further described herein, the features of the disclosed embodiments provide for enhanced accuracy of modeling outcomes, where such outcomes are applicable to providing loss estimates and related information. Further, the features of the disclosed embodiments provide for the enhanced granularity of modeling processes, providing for improvements to the results of such processes, where such results are applied as described herein.

FIG. 1 shows an example block diagram 100 of potential risk sources 130 and manifestations 140 of those risks which are incorporated in catastrophic event modeling, according to an embodiment. The disclosed embodiment addresses two main risk sources that may trigger a catastrophic event: risks that stem from third-party service providers 110, and risks that stem from third-party technology providers 120.

Third-party service providers 110 include shared services, e.g., services provided to multiple businesses or end users, that may be located remotely and accessed over a network, e.g., the internet. These third-party service providers 110 include internet server providers (ISPs), cloud computing or cloud storage providers, DNS providers, cloud email providers, data analysis providers, and the like. The services offered rely on hardware and software that are not based on the premises of the user of said services. For example, a DNS or email server may be operated from a remote location or distributed from multiple remote locations controlled by the provider. Third-party service providers 110 are vulnerable to a single point of failure, as a successful attack at one location, for example, a central server location of a shared DNS server providing DNS services to hundreds or thousands of clients, will negatively affect all clients that rely on that shared server immediately.

Third party technology providers 120 include providers of technologies which are created by a third party and distributed to many clients, such as software authored by a single entity but licensed to be used by many clients. Examples include operating systems, such as Microsoft® Windows®, database software, third-party software libraries, such as encryption libraries employed in web servers or point of sale devices, common protocols employed by many end users, and the like. Here, a flaw found in the software itself creates vulnerabilities in each system running the software, namely each individual client, rather than in a single central location.

A catastrophic event occurs when a widely-used service or technology is breached or attacked, such that a significant number of clients are affected. In order to successfully determine the likelihood of a catastrophic event, a catalog is formed that includes various potential cyber events that are classified into multiple subclassifications. The subclassifications can then be analyzed and employed in simulations described further below. For third party service provider 110 events, the subclassifications include at least a provider type, and an impact type. The provider type includes categories of services, such as DNS, email, cloud computing and the like. An impact type defines how a business is affected by an event and the potential damage caused. This includes data loss, data theft, outages, and the like. In an embodiment, the catalog includes the provider types and impact types of past events.

For third party technology providers 120, the sub-classifications include the type of technology, such as databases, web servers, software libraries, and the like, as well as the impact type noted above, e.g., data loss, data theft, outages, and so on.

An additional subclassification is an event scope which includes information related to the geographical location of the event. Such a geographical location subclassification differs from a corresponding classification of a natural catastrophic event in that, rather than being centered around where the event occurs, the location of a cyber event can be spread worldwide. For example, AWS® runs on servers located in many countries around the world. If a server in Virginia, USA, which serves clients in western Europe or southeast Asia, is successfully attacked, the clients' location is the relevant affected area, rather than the location of the server. Similarly, hardware built and sold by a U.S. company may be used by international businesses across the globe. Thus, the location of those affected by the attack must be determined and categorized for proper damage estimation, regardless of the location of the physical server.

The statistical distribution may be based on extrapolated data from past events. In an embodiment, this distribution is determined based on data collected from various users, where the data includes mapping service and technology providers to physical locations of its users. If an AWS® server in Virginia is configured to serve clients in Japan, a breach in the Virginia server will be associated with risk for clients in Japan.

Figure 2:
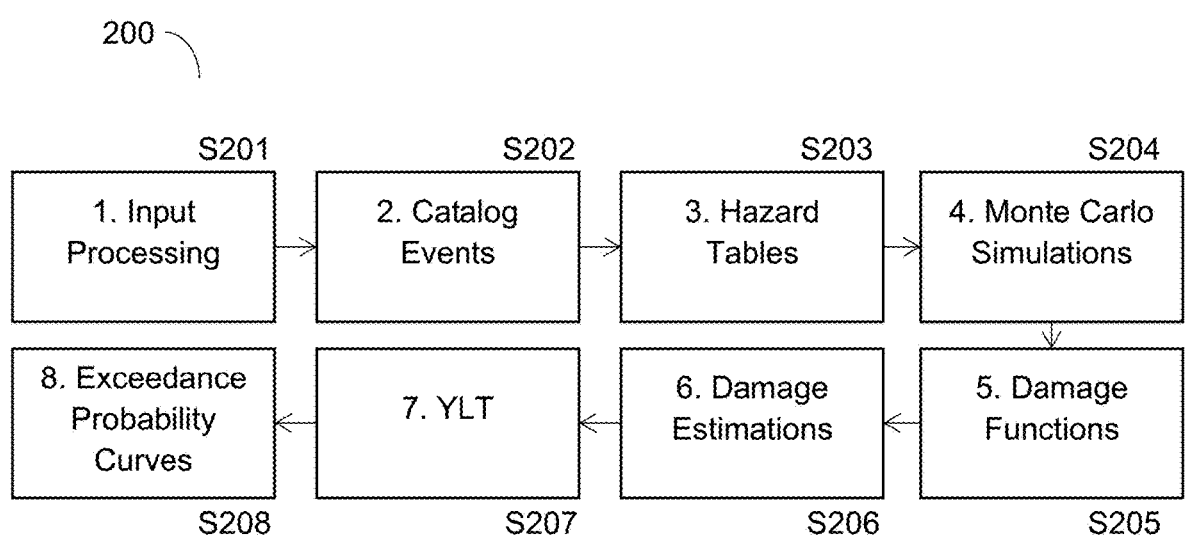
FIG. 2 is an example flowchart illustrating a method of modeling catastrophic events, according to an embodiment.

FIG. 2 is an example flowchart 200 illustrating a method of modeling catastrophic events, according to an embodiment.

At S201, low-resolution cyber event data is received and processed to improve the data quality. The processing includes a number of steps to ensure that the data is prepared for the simulation step discussed below.

In an embodiment, execution of S201 includes a data cleansing, first performed for the supplied companies' data, where the data itself is modified and formatted for use in modeling. This cleansing includes converting data to a preferred format. For example, if a model is designed to simulate costs based on U.S. dollars, and the input data is presented in Euros, a currency conversion is applied to the data to ensure it is uniform.

Next, S201 may further include data omitting, where irrelevant data may be removed. Such omitting may include, for example, removing any data from certain countries or jurisdictions which are determined to be excluded from the simulation.

The final stage in the execution of S201 may include data augmentation, where data which is not sufficiently accurate is enhanced by retrieving additional data necessary to increase the data's accuracy. For example, if a model requires granular location details about a client, but only the country of residence is provided in the input data, the missing data may be determined. Thus, if a set of clients only includes a location specifying the United States, the relevant states of residence may be determined, e.g., based on available zip code information, and used to augment the original data.

Data received and processed at S201 may be grouped according to one or more input groups, such input groups including, as examples and without limitation, industry, country, and coverage type.

At S202, an event catalog is created. The event catalog is a collection of one or more recorded cyber events, predicted cyber events, or any combination thereof. Further, the event catalog may be configured to include, for each cyber event record included therein, one or more descriptors, such descriptors including, without limitation, technologies affected by a specific cyber event, service providers affected by a specific cyber event, and the like, as well as various combinations thereof. As may be applicable to the embodiments described herein, a technology, as may be included as a descriptor of an event catalog record, is a product, service, application, or other, like, suite, package, toolkit, or the like, which an organization may implement or include in one or more products or operations. Examples of technologies include, without limitation, cybersecurity software, office productivity software, database-management packages, and the like. Further, as may be applicable to the embodiments disclosed herein, a service provider, as may be included as a descriptor in an event catalog record, is an organization, company, or other, like, provider of services, technologies, and the like. As an example, where a given technology is the Microsoft® Office® suite, which may be licensed by a client organization on a per-user subscription basis, the relevant service provider may be Microsoft®. In an example embodiment, the event catalog includes a list of potential catastrophic events. The creation of the event catalog includes several steps.

In an embodiment, S202 includes determination of a distribution of all event parameters and assignment of a set of restriction rules. The parameter distribution and restriction rules are used to create the events in the event catalog.

In order to discover the underlying distribution of all event parameters, data from past events is extrapolated. In an embodiment, this step includes collecting data from multiple databases, such as CVE data and open-source monitoring dashboards. In another embodiment, active exploitation databases are accessed and threat intelligence data collection is performed. Such access and collection may be used to extract exploit kits used by attackers, as well as details identifying targeted technologies.

As an example, to calculate the distribution of the duration of a provider-type event, i.e., the amount of time in which the event took place, the durations of all past provider-type events are examined and fit into a distribution. For each parameter, e.g., industry, location, coverage type, and the like, many possible distributions are examined and are combined using Bayesian inference. Because the method relies on statistics, a sufficiently large sample size may be required to ensure accurate results. In an embodiment, determining the distribution may include using validation and test sets as control groups.

In an embodiment, a set of restriction rules is employed, where the set of restriction rules restrict the way in which synthetic events are created. The restriction rules are based on current cyber event knowledge, historical events, and cyber academic research. For example, for a cyber event including exploitation of a vulnerability in a database product that is only sold and operated in China, the event location will be limited to China.

Using the parameter distribution and restriction rules discussed above, a large set of synthetic events is generated for the creation of a full event catalog. For example, an event catalog may include 100,000 different synthetic events. The generation of synthetic events is based on the parameter distribution calculated in the previous step. Therefore, the probability of an event appearing in the event catalog is related to the likelihood of the event occurring. Based on the statistical distribution, a large portion of the event catalog may include moderately-severe events, as the more severe an event is, the less likely the event is to appear in the catalog.

It should be noted that there may often be an approximately equal number of provider and technology event types in the catalog. For example, for an event catalog with 100,000 entries, the catalog may include 50,000 technology event types and 50,000 provider event types.

In an embodiment, using a K-means algorithm, the full event catalog is distilled, or "boiled-down," to a smaller subset, e.g., of 25,000 events, in order to reduce the number of similar events within the event catalog. Such a number (e.g., 25,000) is derived from an average number of events that occur in a year period. The usage of a yearly average number of events, that may also be used as the '$\lambda$' parameter of a Poisson distribution in the Monte Carlo simulation discussed below, assures that the size of the boiled-down catalog is sufficiently large and contains enough events for a useful Monte Carlo simulation.

In an example embodiment, the boil-down process may include clustering together events that share similar parameters and adjusting the rate of the clustered events accordingly. After clustering, all events in the event catalog are examined to ensure that they are all possible, i.e., have a sufficient likelihood of occurring in practice. This is required to ensure that events may have a significant effect in the event catalog.

In an embodiment, after the boil-down process, past events are employed as a control measure to ensure that events that have already happened appear in the event catalog. This may be performed by checking whether the frequency of each parameter matches the historic catalog frequency.

Each event within the "boiled-down event catalog" (i.e., the outcome of the boil-down process) is assigned an event ID that is constant and used each time the model is run. The event IDs only change when the model is updated to accommodate new data regarding new events, threats, and changes happening in the cyber and IT ecosystem. These updates are necessary to maintain a realistic and plausible set of events within the catalog.

It should be noted that, at this point of the process, an equal number of provider and technology events remain in the catalog, e.g., 12,500 events for each event type.

At S203, a hazard table is created to estimate exposure to a cyber event. The hazard table is a summary representation of assets (services and technologies) that are used by the companies. In an embodiment, the hazard table is created by actively mapping, to the security controls, the assets used by every insured company. It should be noted that a table is only one example, and that other data structures may be applicable.

It should be understood that S202 and S203 may be executed in any order, including simultaneously, without loss of generality or departure from the scope of the disclosure.

At S204, a Monte Carlo simulation is run on the boiled-down event catalog using the contents of one or more hazard tables as parameters. The execution of the Monte Carlo simulation at S204 provides, for each year modeled, an assessment of which companies, of those included in the one or more hazard tables, will be affected by cyber events, such as the cyber events described in the boiled-down event catalog. In an example embodiment, a standard Monte Carlo simulation of 10,000 years is run based on the events in the boiled down catalog.

For each simulated year, a number of events simulated in that year is sampled from a Poisson distribution with a '$\lambda$' parameter. As noted above, the '$\lambda$' parameter represents the average number of events that happen in a year, where the '$\lambda$' parameter is determined based on an analysis of past event data. Thus, the probability that each event is chosen is the event's rate multiplied by the '$\lambda$' parameter.

After determining the number of events in a simulated year, events are chosen from the boiled-down event catalog for the simulation. Each selected event is categorized as either a provider-type event or a technology-type event. This is performed by sampling using a parameter that defines the ratio between the two types of events. While the ratio may start out as 1:1, the ratio parameter can change often when incorporating new data. By using this parameter, the ratio can be frequently updated without having to change the entire event catalog.

At S205, damage functions are employed to estimate the potential damage of cyber events included within the catalog. The damage function's input is the local intensity of an event, and the function yields a damage factor. The local intensity parameter generation is further explained below. The damage factor indicates the estimated damaged percentage of the exposed value. A damage factor of 1 means a total loss of the exposed value, and a damage factor of 0 means the cyber event has had no effect.

A damage function is based on two or more parameters including, as examples and without limitation, industry, event type, coverage type, business size, business industry, business location, and the like. Each parameter has a direct relation to the proportion of damage caused. For example, a cyber event that caused a cloud outage will likely affect an e-commerce company more than the event will affect a law firm, as the cloud functions will likely tie more closely to the core business of the e-commerce company. Thus, such an event may trigger business interruption coverage for the e-commerce company, while failing to do so for the law firm.

It should be noted, however, that while, according to the example, the industry type parameter is the most relevant parameter in the above example, the damage function will likely also be affected by the other parameters, namely the event type, location, and coverage type. A change in any of these parameters will also change the damage estimation and, therefore, all parameters are needed in order to define the damage function. In an embodiment, historic incident data with financial impact, insurance claim data, academic research, and the like, are also used to determine the damage function value.

At S206, potential damages from cyber events are estimated. When estimating damage, the input groups from S201 are used, namely industry, country, and coverage type. The impact that each cyber event has on each group is determined based on all of the events in the catalog. The damage of each event on each group, as a whole, is then determined. To calculate the event damage estimation, a local intensity factor is determined for each event. The local intensity of an event combines the intensity of the event and the amount of exposure of a portfolio entity, e.g., a single company in the portfolio insured by a single insurance company, to the relevant event.

The intensity of an event is derived from the event parameters. For example, an event with a long duration and a large scope will have a higher intensity than an event with a small scope and short duration.

The exposure of a portfolio to the event is derived from the hazard tables. For each company in the portfolio, the corresponding hazard data is used. The intensity and the exposure are then used to calculate the local intensity, and the damage function is used to determine the damage factor.

As an example, a damage factor may reflect the effect of an AWS outage in an Austrian data center on a company that uses that data center. If the intensity of the event is determined to be 0.5 and the exposure of the company for an AWS Austrian data center outage is 0.3, the local intensity is calculated by multiplying the exposure factor by the intensity factor. Thus:

exposure factor*intensity factor=local intensity 0.3*0.5=0.15

After calculating the local intensity, the relevant damage function is used to calculate the damage factor. In the current example, the relevant damage function yields a damage factor of 0.5 for a local intensity of 0.15. The damage factor can then be used to calculate the ground-up loss.

At S207, a yearly loss table (YLT) is created based on the damage estimations. The YLT is a table that contains all of the events from the Monte Carlo simulation, combined with the damage estimation per company for each event, and a brief description of the event. For example, a YLT may include a row indicating that, in year 3, a cloud storage vulnerability may be discovered, with an associated damage estimate of $940 million.

Figure 3:
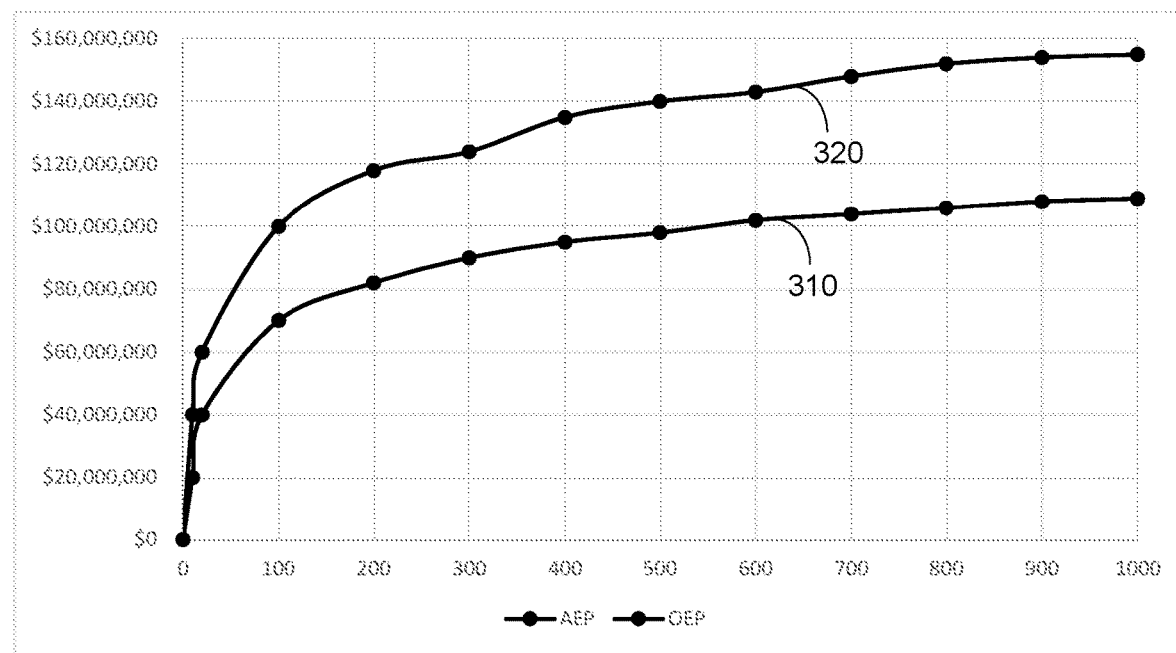
FIG. 3 is a graph showing the EP curves generated, according to an embodiment.

At S208, exceedance probability (EP) curves are determined. The determination of EP curves includes reducing the YLT in at least one of two ways: calculating an annual exceedance probability (AEP) by summing the damages of each year, and calculating an overall exceedance probability (OEP) by only focusing on an event with the maximum damage for each year. These reduced tables are used to plot the EP curves. An example graph showing the EP curves is described with respect to FIG. 3, wherein FIG. 3 is a graph showing the EP curves generated, according to an embodiment. The OEP is a curve 310 and a YLT is curve 320.

Figure 4:
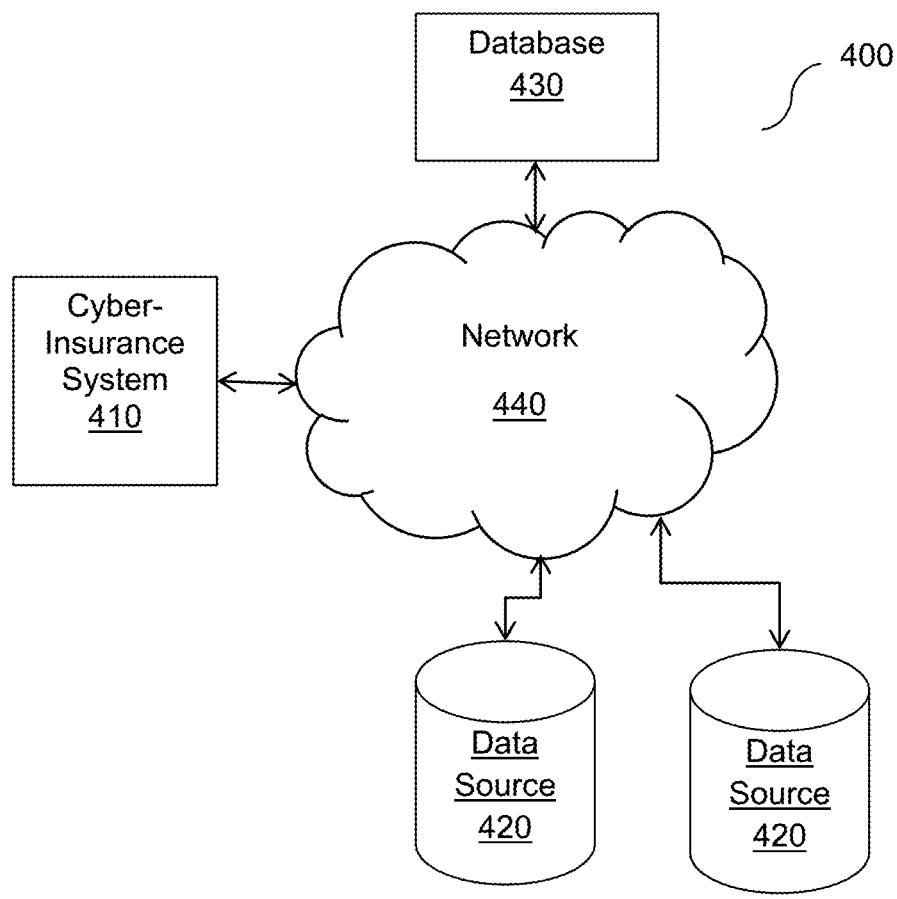
FIG. 4 is a network diagram illustrating a deployment of a cyber-insurance system for catastrophic event modeling, according to an embodiment.

FIG. 4 shows an example network diagram 400 illustrating a deployment of a cyber-insurance system 410 for catastrophic event modeling, according to an embodiment.

The diagram 400 depicts the cyber-insurance system 410, a plurality of data sources 420, and a database 430 communicating over a network 440. The network 440 may be, but is not limited to, a wireless, cellular, or wired network, a local area network (LAN), a wide area network (WAN), a metro area network (MAN), the Internet, the world wide web (WWW), a network similar to those described, and any combination thereof.

In an example embodiment, the data sources 420 provide the data used in past event extrapolation. The data sources 420 may include Common Vulnerabilities and Exposures (CVE) databases, open-source monitoring dashboards, active exploitation databases, and threat intelligence data sources.

The cyber-insurance system 410 is configured to perform various embodiments disclosed herein. Specifically, the system 410 is configured to implement processes for catastrophic event modeling as discussed with reference to FIG. 2.

The cyber-insurance system 410 may be implemented as a physical machine, a virtual machine, or a combination thereof. A block diagram of an example depicting a physical machine implementation, is discussed below with reference to FIG. 5. A virtual machine may be any virtual software entity, such as a software container, a micro service, a hypervisor, and the like.

The database 430 may store the event catalogs, the hazard tables, the exceedance probability curves and data, or any other report that can be generated according to the disclosed embodiments. The database 430 may be a relational database or a NoSQL type of database such as, but not limited to, MongoDB. Examples of relational databases may include, but are not limited to, Oracle®, Sybase®, Microsoft SQL Server®, Access®, Ingres®, and the like. In an embodiment, the database 430 may be a plurality of logical entities residing in the same physical structure.

In an embodiment, the optional database 430 may be included in the system 410. In an alternate embodiment, the optional data store may be realized as separate components connected directly with the network 440, with the system 410, or both.

It should be noted that the embodiments disclosed herein are not limited to the specific architecture illustrated in FIG. 4, and that other architectures may be equally used without departing from the scope of the disclosed embodiments. Specifically, the cyber-insurance system 410 may reside in a cloud computing platform, a datacenter, and the like. The cloud computing platform may be a private cloud, a public cloud, a hybrid cloud, and the like. Moreover, in an embodiment, there may be a plurality of systems operating as a distributed system. Further, the database 430 may be distributed as well. In some implementations, the cyber-insurance system 410 may be an internal component or instance of any of the data sources 420. In an embodiment, the cyber-insurance system 410 may include one or more data stores.

Figure 5:
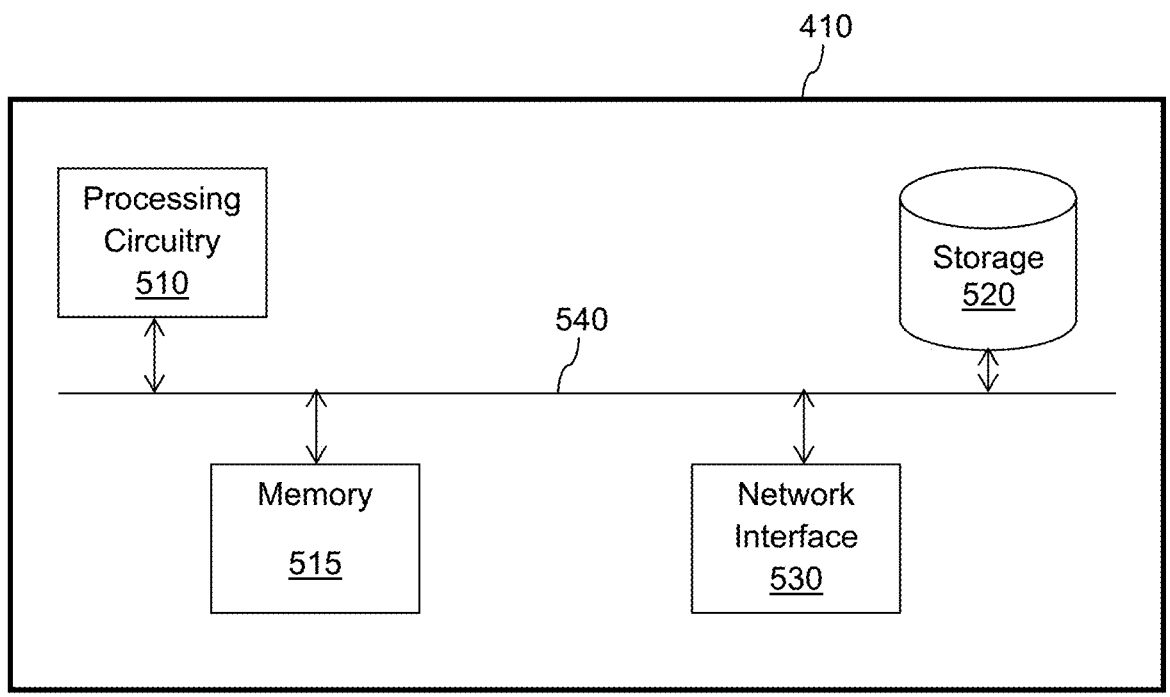
FIG. 5 is a block diagram of the cyber-insurance system, according to an embodiment.

FIG. 5 shows an example block diagram of the cyber-insurance system 410, according to an embodiment. The cyber-insurance system 410 includes a processing circuitry 510 coupled to a memory 515, a storage 520, and a network interface 530. In an embodiment, the components of the system 410 may be communicatively connected via a bus 540, e.g., PCIe or other high-speed data bus.

The processing circuitry 510 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, graphics processing units (GPUs), tensor processing units (TPUs), general-purpose microprocessors, microcontrollers, and digital signal processors (DSPs), and the like, or any other hardware logic components that can perform calculations or other manipulations of information.

The memory 515 may be volatile (e.g., RAM, etc.), non-volatile (e.g., ROM, flash memory, etc.), or a combination thereof. In one configuration, computer readable instructions to implement one or more embodiments disclosed herein may be stored in the storage 520.

In another embodiment, the memory 515 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 510 to perform the various processes described herein.

The storage 520 may be magnetic storage, optical storage, and the like, and may be realized, for example, as flash memory or other memory technology, CD-ROM, Digital Versatile Disks (DVDs), or any other medium which can be used to store the desired information.

The network interface 530 allows the system 410 to communicate with the at least one various data sources or databases. It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for catastrophic cyber event modeling, comprising:
    generating a cyber event catalog based on a past cyber event, the cyber event catalog including a plurality of cyber events, wherein generating the cyber event catalog further comprises:
    determining a distribution of all event parameters by extrapolating one or more data points from a past event; and
    assigning a set of restriction rules, wherein the parameter distribution and the set of restriction rules are used to create events in the event catalog;
    simulating a cyber event, of the plurality of cyber events included in the cyber event catalog, to predict whether an organization is affected by a simulated cyber event, wherein the organization is an organization selected from a hazard table, and wherein the simulating cyber event simulates malicious activity in the organization; and
    estimating a damage of the cyber event on the organization by employing a damage function.

2. The method of claim 1, wherein simulating the cyber event further comprises:
    simulating the cyber event via a Monte Carlo simulation.

3. The method of claim 1, wherein the event catalog includes a plurality of potential catastrophic events.

4. The method of claim 1, wherein determining the distribution of all event parameters further comprises:
    collecting data from at least one of: a CVE database, and an open-source monitoring dashboard.

5. The method of claim 1, wherein determining the distribution of all event parameters further comprises:
    accessing an active exploitation database; and
    collecting threat intelligence data.

6. The method of claim 1, wherein determining the distribution of all event parameters further comprises:
    using validation and test sets as control groups.

7. The method of claim 1, wherein determining the distribution of all event parameters further comprises:
    using a K-means algorithm to distill a full event catalog to a smaller subset.

8. The method of claim 1, wherein estimating the damage further comprising:
    processing an input, the input including an input group;
    generating one or more hazard tables;
    evaluating the damage function;
    determining a damage estimation;
    generating a yearly loss table (YLT); and
    generating an exceedance probability (EP) curve.

9. The method of claim 8, wherein generating one or more hazard tables further comprises:
    actively mapping, to one or more security controls of a plurality of security controls, one or more assets used by one or more insured companies.

10. The method of claim 8, wherein generating one or more EP curves further comprises:
    calculating at least one of: an annual exceedance probability (AEP), and an overall exceedance probability (OEP), wherein an AEP is calculated by summing damages of each year, and wherein an OEP is calculated by focusing on an event with the maximum damage for each year.

11. A non-transitory computer readable medium having stored thereon instructions for causing a processing circuitry to execute a process for catastrophic event modeling, the process comprising:
    generating a cyber event catalog based on a past cyber event, the cyber event catalog including a plurality of cyber events, wherein generating the cyber event catalog further comprises:
    determining a distribution of all event parameters by extrapolating one or more data points from a past event; and
    assigning a set of restriction rules, wherein the parameter distribution and the set of restriction rules are used to create events in the event catalog;
    simulating a cyber event, of the plurality of cyber events included in the cyber event catalog, to predict whether an organization is affected by a simulated cyber event, wherein the organization is an organization selected from a hazard table, and wherein the simulating cyber event simulates malicious activity in the organization; and
    estimating a damage of the cyber event on the organization by employing a damage function.

12. A system for catastrophic cyber event modeling, comprising:
   a processing circuitry; and
   a memory, the memory containing instructions that, when executed by the processing circuitry, configure the system to:
   generate a cyber event catalog based on a past cyber event, the cyber event catalog including a plurality of cyber events, wherein the system is further configured to:
   determine a distribution of all event parameters by extrapolating one or more data points from a past event; and
   assign a set of restriction rules, wherein the parameter distribution and set of restriction rules are used to create events in the event catalog;
   simulate a cyber event, of the plurality of cyber events included in the cyber event catalog, to predict whether an organization is affected by a simulated cyber event, wherein the organization is an organization selected from a hazard table, and wherein the simulating cyber event simulates malicious activity in the organization; and
   estimate a damage of the cyber event on the organization by employing a damage function.

13. The system of claim 12, wherein the system is further configured to:
   simulating the cyber event via a Monte Carlo simulation.

14. The system of claim 12, wherein the event catalog includes a plurality of potential catastrophic events.

15. The system of claim 12, wherein the system is further configured to:
   collect data from at least one of: a CVE database, and an open-source monitoring dashboard.

16. The system of claim 12, wherein the system is further configured to:
   access an active exploitation database; and
   collect threat intelligence data.

17. The system of claim 12, wherein the system is further configured to:
   use validation and test sets as control groups.

18. The system of claim 12, wherein the system is further configured to:
   use a K-means algorithm to distill a full event catalog to a smaller subset.

19. The system of claim 12, wherein the system is further configured to:
   process an input, the input including an input group;
   generate one or more hazard tables;
   evaluate the damage function;
   determine a damage estimation;
   generate a yearly loss table (YLT); and
   generate an exceedance probability (EP) curve.

20. The system of claim 19, wherein the system is further configured to:
   actively map, to one or more security controls of a plurality of security controls, one or more assets used by one or more insured companies.

21. The system of claim 19, wherein the system is further configured to:
   calculate at least one of: an annual exceedance probability (AEP), and an overall exceedance probability (OEP), wherein an AEP is calculated by summing the damages of each year, and wherein an OEP is calculated by focusing on an event with the maximum damage for each year.

* * * * *